Patented July 22, 1930

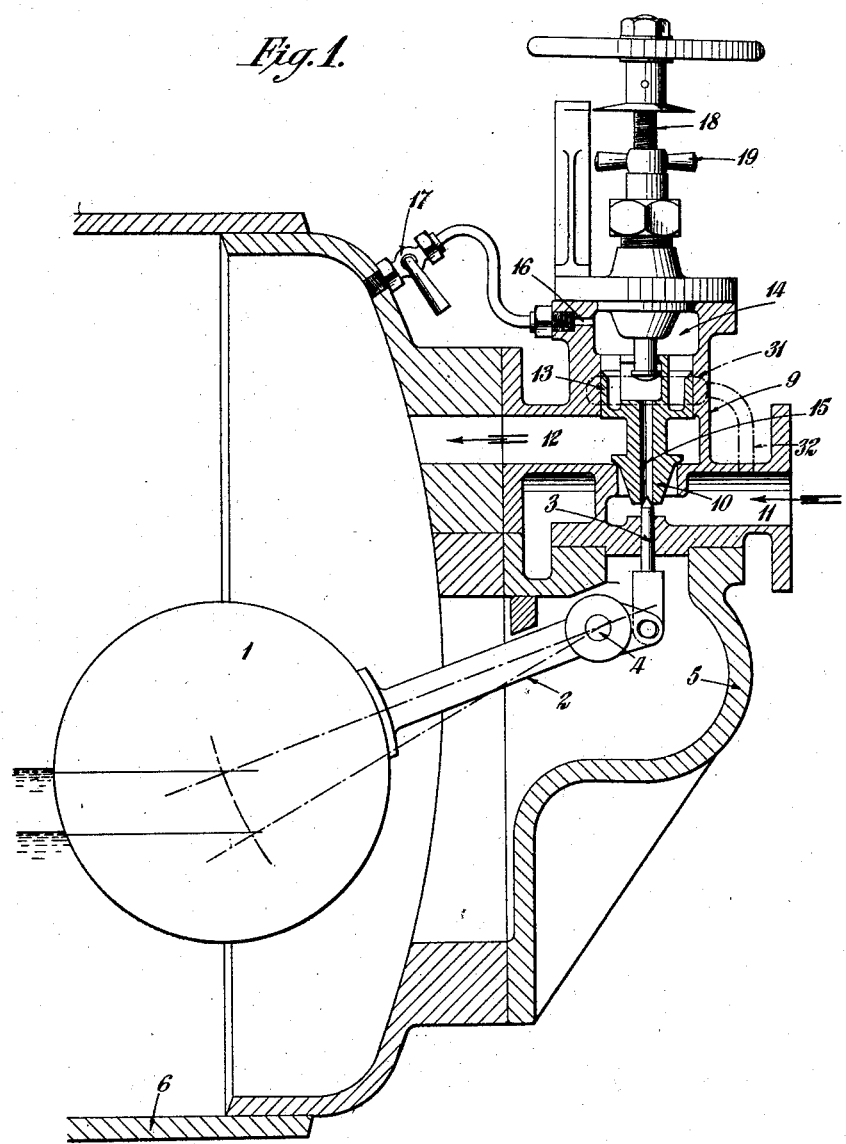

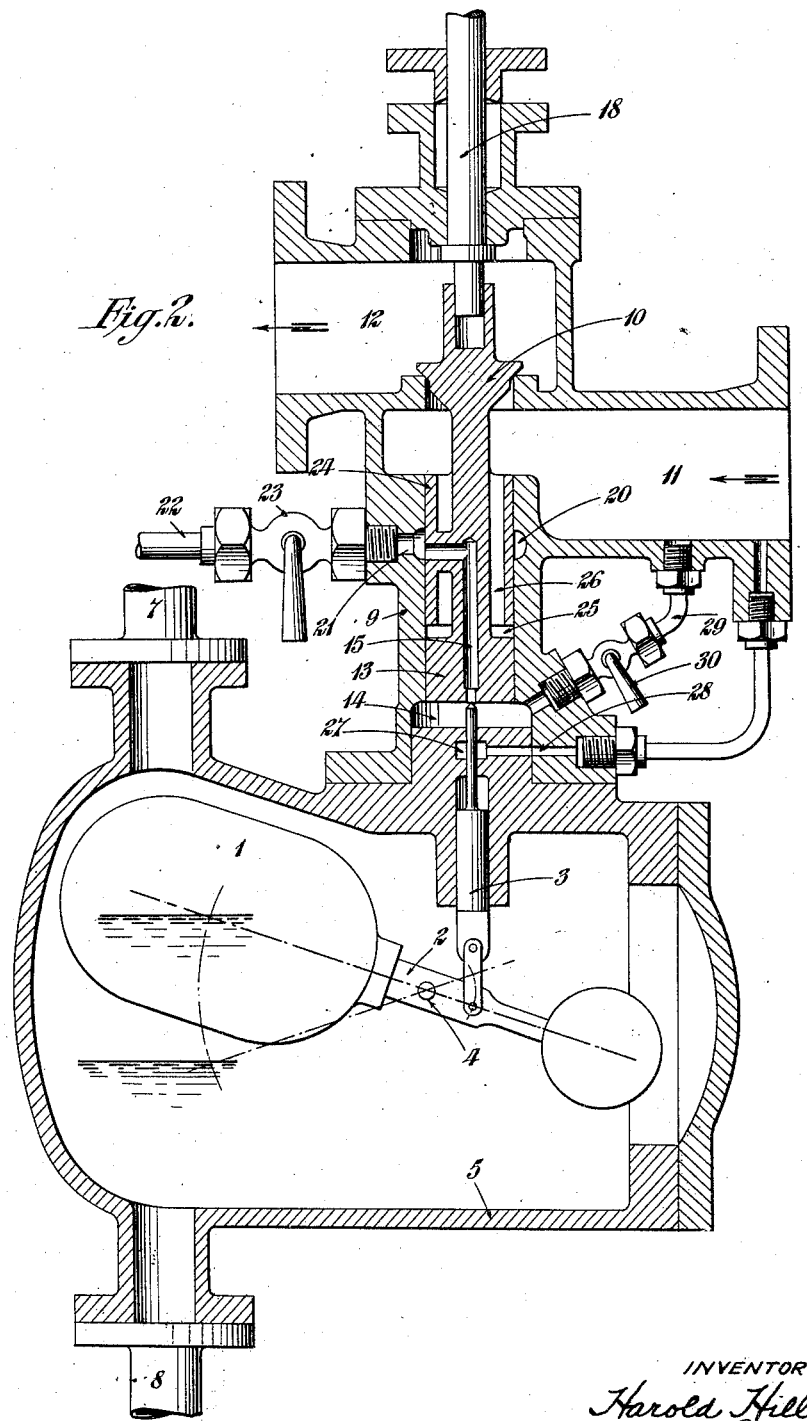

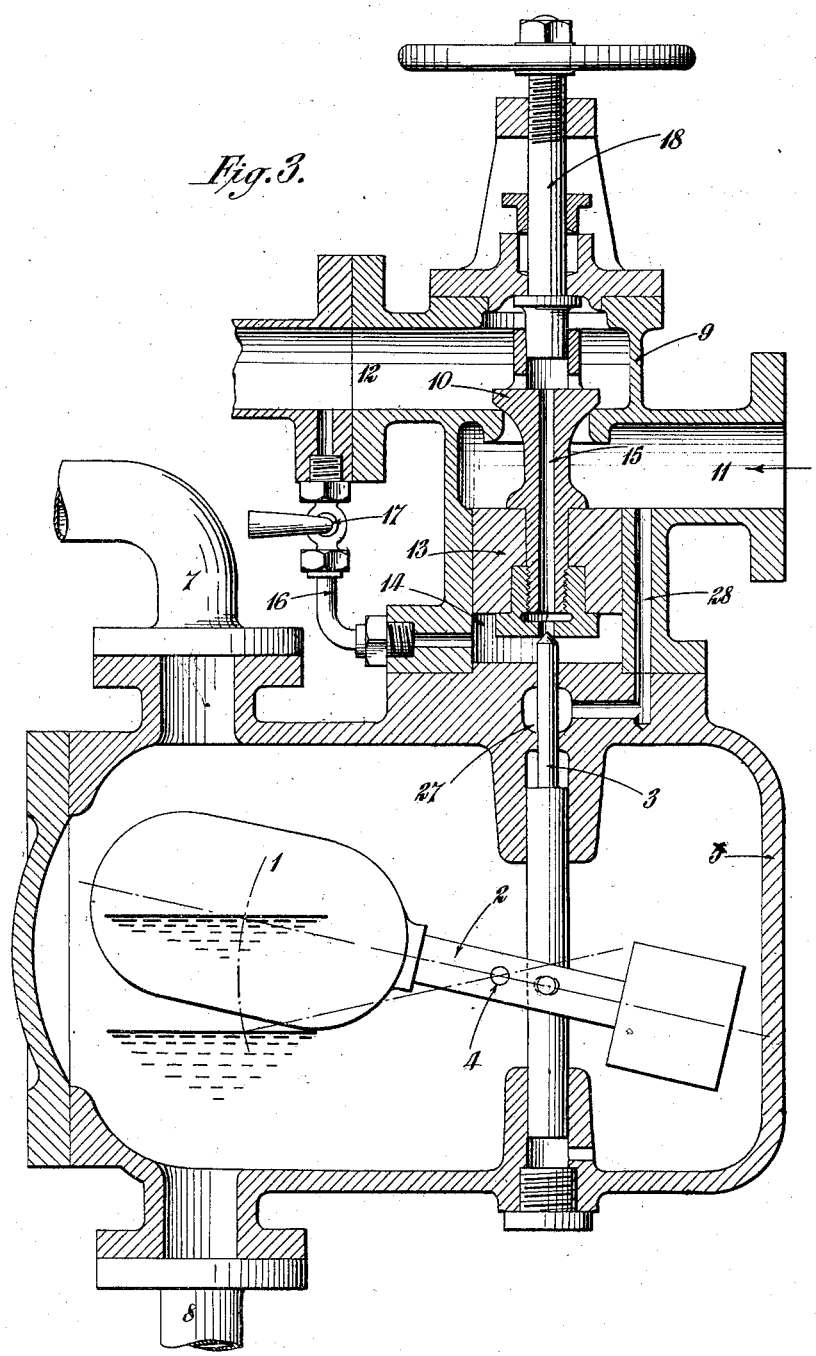

1,771,331

UNITED STATES PATENT OFFICE

HAROLD HILLIER, OF WESTMINSTER, LONDON, ENGLAND

FEED-WATER-SUPPLY REGULATOR INTENDED PARTICULARLY FOR USE WITH STEAM BOILERS

Application filed July 5, 1928, Serial No. 290,593, and in Great Britain July 8, 1927.

This invention relates to apparatus for controlling the flow of a liquid into a vessel in accordance with the withdrawal from the vessel of the said liquid, either as a vapour or in its liquid state, and particularly to apparatus in which the valve admitting the liquid into the vessel is operated by liquid pressure controlled by a float which rises and falls with the level of the liquid in the vessel.

In apparatus of the kind referred to, the said valve is usually provided with a piston which is sometimes the same diameter as the valve and sometimes larger in diameter than the valve. One side of the piston and the inlet side of the valve are arranged to be subjected to the pressure of the liquid which is being discharged into the vessel. The other side of the piston is subjected to the pressure of the liquid in a chamber into which the liquid flows through a fixed orifice or the equivalent and from which chamber the liquid can flow to a place of lower pressure through a variable opening which is opened and closed by an auxiliary valve connected to and actuated by the movement of the float.

When the float falls, the auxiliary valve closes the variable opening, the flow of liquid from the chamber ceases and the pressure of the liquid in the chamber rises until the resultant force acting on the valve causes the valve to open and liquid flows into the vessel.

When the float rises, the auxiliary valve opens the variable opening and the pressure in the chamber is relieved, due to the flow of liquid from the chamber through the variable opening. The relieving of the pressure on the face of the piston in the chamber changes the direction of the resultant force, causes the valve to close and stops the flow of liquid into the vessel.

Hitherto, in apparatus of the kind described, the variable opening through which the liquid flows has been arranged in the stationary walls of the chamber and immediately the pressure in the chamber rises sufficiently to allow the valve to open, the valve opens to its full extent and remains wide open until the rising liquid level in the vessel causes the float to open the variable opening, when the valve immediately closes and completely cuts off the flow of liquid into the vessel.

The flow of liquid into the vessel is, therefore, intermittent and occurs only when the level of the liquid falls below a predetermined level when the valve is opened to its full extent until the liquid level is restored to the predetermined level.

In vessels in which a liquid is evaporated, such as a boiler, it is particularly desirable that the rate of the flow of the liquid into the vessel should be continuous and should correspond with the rate at which the liquid is evaporated, because variations between the rate of the supply of liquid and the rate of evaporation cause the level of the liquid to fluctuate, even though the rate of evaporation is constant, and such fluctuations are reflected in undesirable variations in the pressure and the dryness of the vapour formed by evaporation.

Further, I have found from experiment that the rate at which dry evaporated liquid can be formed depends upon the height between the level of the liquid and the point at which the evaporated liquid is withdrawn and that it is necessary to increase this height as the rate of evaporation is increased in order to prevent drops of liquid being carried over with the vapour formed by evaporation.

The present invention is an improved apparatus which automatically adjusts the rate at which the liquid flows into a vessel to correspond with the rate at which the liquid and/or evaporated liquid is withdrawn from the vessel, and causes the level of the liquid in the vessel to fall automatically as the rate of evaporation is increased.

For this purpose I arrange the variable opening as a passage in the piston, or other member attached to the valve, so that the piston and valve are constrained hydraulically to move with the auxiliary valve which is mechanically connected to and actuated by the float and controls the pressure in the chamber in which the piston moves, the valve being closed when the float is at a predetermined high liquid level, full open when the float is at a predetermined low liquid level and proportionally open when the float is at an intermediate liquid level.

The pressure in the chamber may be the result of a flow of liquid into the chamber through the passage in the piston under the control of the auxiliary valve and a flow of liquid from the chamber through a fixed orifice, or I may arrange for the pressure in the chamber to be the result of a flow of liquid into the chamber through a fixed orifice and a flow of liquid from the chamber through the passage in the piston under the control of the auxiliary valve.

I may provide additional orifices to allow a flow of supplementary liquid into or out of the chamber, such orifices being provided with means for the adjustment of the flow of supplementary liquid.

Further, I may arrange the shape or contour of the valve so that the area through the valve increases gradually from zero to a maximum as the float falls from the high level to the low level, or I may arrange the shape of the valve so that the rate at which the area through the valve increases is increased or decreased as the float falls from the high level to the low level.

I have found that to enable the valve to operate with a minimum difference between the pressure of the liquid supply and the pressure in the vessel, or alternatively to obtain the maximum force for a given difference between the pressure of the liquid supply and the pressure in the vessel, it is necessary to obtain the full pressure of the liquid supply in the chamber in which the piston moves.

For this purpose, in accordance with my invention, I arrange for the liquid to flow into the chamber through the fixed orifice, or the equivalent, and provide for the flow of liquid from the chamber through the passage in the piston under the control of the auxiliary valve. The liquid flowing through the passage in the piston passes into the vessel or I may arrange the passage in the piston to be in constant communication with other passages in the casing leading to a place of lower pressure so as to allow the liquid flowing through the passage in the piston to flow freely to the place of lower pressure.

To prevent any possibility of liquid leaking from the chamber to a place where the pressure is lower than the pressure of the liquid supply, except under the control of the auxiliary valve, or through a supplementary orifice the flow through which can be adjusted or stopped as desired, I may arrange at suitable positions between the chamber and any place of pressure lower than the pressure of the liquid supply, a space or spaces surrounding any part of the apparatus moving into or out of the chamber, such as the piston or auxiliary valve, the said space or spaces being placed in free communication with the liquid supply so that the pressure in such space or spaces is substantially the same as that of the liquid supply.

Leakage from the chamber except through the passage in the piston is thereby prevented so that when the auxiliary valve closes the passage through the piston, the pressure in the chamber can rise until it is substantially the same as the pressure of the liquid supply.

In order that my invention may be more clearly understood and readily carried into practice the same will now be more fully described with reference to the accompanying drawings in which the same numerals are used to denote similar parts.

Fig. 1 is a sectional elevation of a boiler feed water regulator with the piston arranged above the valve.

Fig. 2 is a sectional elevation of a boiler feed water regulator with the piston arranged below and of the same diameter as the valve.

Fig. 3 is a sectional elevation of a boiler feed water regulator with the piston arranged below and larger in diameter than the valve.

Referring to Fig. 1, the regulator comprises a float 1 which is secured to one end of a lever 2 to the other end of which is attached the auxiliary valve 3, the lever being being free to rotate about a fulcrum 4 so that the auxiliary valve 3 rises when the float 1 falls and falls when the float 1 rises. The float 1 is arranged in a casting 5 which is connected to the boiler 6 so that the float moves freely with the level of the water in the boiler. The casing 9 of the valve 10 is mounted on the casting 5 and the auxiliary valve 3 penetrates and terminates inside the casing 9.

The water discharged by the feed pump enters the casing 9 by the inlet branch 11 and, after passing the valve 10, flows through the outlet branch 12 into the boiler 6. The valve 10 is extended to form a piston 13 of larger diameter than the valve 10, the piston 13 being arranged above the valve 10 so that it moves in a chamber 14 provided in the casing 9, the space between the valve 10 and the underside of the piston 13 being subjected to the pressure prevailing in the boiler 6.

A passage 15 is provided through the valve 10 and piston 13 so that water can pass from the inlet branch 11 through the passage 15 into the chamber 14. The auxiliary valve 3 is arranged so that it closes or opens the passage 15 as the float 1 falls or rises and thus controls the flow of water into the chamber 14. Water escapes from the chamber 14 through the clearance between the piston 13 and the casing 9. A separate passage 16 is provided for the flow of water from the chamber 14 and the area for the flow of water through the passage 16 may be restricted as desired by the cock 17. The flow of water through the passage 16 may be led to the boiler 6 as shown or, if desired, to a place of lower pressure.

When the float (1) is at the predetermined high water level the auxiliary valve (3) uncovers the passage (15) water flows into the chamber 14 and establishes the pressure of the feed pump discharge on top of the piston 13, thus holding the valve closed. When the water level in the boiler 6 falls, the float 1 raises the auxiliary valve 3 until it cuts off the flow of water through the passage 15. The pressure in the chamber 14 is then relieved by the leakage of water through the clearance between the piston 13 and the casing 9, supplemented as desired by leakage through the passage 16 and cock 17. Immediately the pressure in the chamber 14 is relieved, the resultant force immediately opens the valve 10 and water flows into the boiler 6. The valve 10 can only open to the extent that the auxiliary valve 3 has been raised by the float 1 otherwise the passage 15 would be uncovered, water would flow into the chamber 14 and the valve 10 would commence to close. As the float 1 causes the auxiliary valve 3 to rise and fall, the valve 10 is hydraulically constrained to move with the auxiliary valve 3 so that for any given water level between the predetermined high water level and the predetermined low water level, the auxiliary valve 3 and, therefore the valve 10 takes up a corresponding position the valve 10 being thereby opened by a predetermined amount so that for any given rate of evaporation, the position of the valve 10 is automatically adjusted to allow a steady flow of water into the boiler corresponding to that rate of evaporation.

A hand operated spindle 18 is provided so that when desired the valve 10 can be traversed throughout the length of its stroke in either direction. A locking handle 19 is fitted to enable the spindle 18 to be locked in a neutral position, when desired, so as not to interfere with the automatic operation of the valve 10.

Referring to Fig. 2, the float 1 is arranged in a casting 5 which is separate from the boiler but is connected to the boiler by the pipes 7 and 8 so that the level of water in the casting 5 is the same as the level of the water in the boiler. The piston 13 is arranged below the valve 10 and is the same diameter as the valve 10. The top of the piston 13 and the underside of the valve 10 are subjected to the pressure in the supply pipe 11. The passage 15 through the piston 13 is always in free communication with the annular space 20 and the passage 21 arranged in the casing 9. The passage 21 may be connected to the feed pump suction or the feed tank by a suitable pipe 22 which is provided with a cock 23.

The stem of the valve 10 is provided with a skirt 24 which leaves round the piston 13 an annular space 25 in free communication with the feed supply in the inlet branch 11 by means of passage 26. I may arrange the annular space 25 in the casing 9 and connect the branch 11 to the annular space by an external pipe. An annular space 27 is also provided in the casing round the auxiliary valve 3 and is placed in free communication with the feed supply in the branch 11 by the pipe or passage 28. Water leaks into the chamber 14 from the annular space 25 through the clearance between the piston 13 and the casing 9 and from the annular space 27 round the auxiliary valve 3. A supplementary supply of water may be allowed to flow into the chamber 14 through the pipe 29 under the control of the cock 30. Water leaks out of the chamber 14 through the passage 15 under the control of the auxiliary valve 3.

When the float 1 falls from the predetermined high water level the auxiliary valve 3 closes the passage 15 and the water flowing into the chamber 14 increases the pressure until the pressure in the chamber 14 is in excess of the pressure in the boiler by the amount necessary to lift the weight of the valve and to overcome friction. When this pressure is established the valve rises and allows water to flow into the boiler. When the water level in the boiler rises the float 1 lowers the auxiliary valve 3 until it uncovers the passage 15. The pressure in the chamber 14 is then relieved by the leakage of water through the passage 15 until the valve 10 falls and reduces the flow of water into the boiler.

For any given water level between the predetermined high water level and the predetermined low water level, the valve 10 is maintained in equilibrium in a partially open position corresponding to the water level in the boiler.

Referring to Fig. 3 the piston 13 is larger in diameter and is arranged below the valve 10. The passage 15 through the piston 13 is in free communication with the boiler. When the float 1 falls the auxiliary valve 3 closes the passage 15 and water flows into the chamber 14 through the clearance between the piston 13 and the casing 9 until the pressure in the chamber rises sufficiently to cause the valve 10 to open and allow water to flow into the boiler. When the float 1 rises the auxiliary valve 3 uncovers the passage 15 and the leakage of water from the chamber 14 into the boiler lowers the pressure in the chamber 14 until the valve 10 falls and establishes a new position of equilibrium with a corresponding reduction in the flow of water through the valve 10 into the boiler.

It will be seen from Figs. 2 and 3 that the piston (13) is so acted upon by the liquid supply that the possibility of liquid leaking from the chamber (14) by way of clearances from the piston to a place where the pressure may be lower than the pressure of the liquid supply is prevented, and in Fig. 1 as indicated by dot and dash lines a similar tendency of liquid to leak from the chamber (14) past the piston (13) to the boiler may be restricted or prevented by forming in the casing (9) an annular space 31 placed in free communication with the feed supply in the branch 11 by a pipe 32. The pressure of the liquid supply in the annular space 31 would, when the communication 16 is led to a place of lower pressure, prevent a similar tendency of steam to leak from the boiler past the piston 13 to the communication 16.

What I claim is:

1. Means for controlling the flow of liquid into a vessel, comprising a main valve with a piston which moves in a chamber and a float operated auxiliary valve which controls the pressure in such chamber characterized by the fact that the auxiliary valve, which has a seat movable with the main valve is so arranged in relation to the main valve that a closing movement of the said auxiliary valve causes an opening movement of the main valve and vice versa, the extent to which the main valve is moved being governed by the travel of the auxiliary valve, substantially as described for the purpose herein set forth.

2. Means for controlling the flow of liquid into a vessel, comprising in combination with such vessel, a valve casing having a connection leading to the vessel and a connection leading to the source of liquid to be supplied thereto, a main valve between said connections adapted to be moved hydraulically in both directions, a piston-like extension upon said valve, a chamber in which said extension is adapted to move, such piston having a passage opening into the chamber aforesaid through which liquid can flow to vary the pressure in the chamber, an auxiliary valve adapted to open and close such passage at different positions occupied by the main valve and its extension and a float responsive to variations of liquid level in the vessel to which the liquid is to be supplied and adapted to alter the position of the auxiliary valve in order to regulate the flow of liquid through the passage in the main valve extension and control the pressure in the chamber aforesaid, the said auxiliary valve opening as the float rises so that the main valve is thereby hydraulically constrained to move in closing direction and conversely closing as the float falls so that the main valve is hydraulically constrained to open, substantially as described.

3. Means for controlling the flow of liquid into a vessel, according to claim 2, in which the opening of the main valve is the result of the flow of liquid through a fixed orifice into the chamber associated with the main valve piston-like extension when the auxiliary valve is closed and closure of said main valve is the result of a flow of liquid from the chamber through the passage in the said extension when the auxiliary valve is open.

4. Means for controlling the flow of liquid into a vessel, according to claim 2, in which the opening of the main valve is the result of the flow of liquid through a fixed orifice into the chamber associated with the main valve piston-like extension supplemented by a flow of liquid into such chamber through an additional orifice provided with means for the adjustment of the supplementary flow of liquid and closure of said main valve is the result of a flow of liquid from the chamber through the passage in the said extension when the auxiliary valve is open.

5. Means for controlling the flow of liquid into a vessel, according to claim 2, in which a space is provided around the piston-like extension of the main valve, such space being in free communication with a place of pressure at or above the pressure in the vessel and adapted to prevent leakage from the chamber associated with such piston-like extension, past such extension.

6. Means for controlling the flow of liquid into a vessel, according to claim 2, in which a space is provided around the piston-like extension of the main valve, said space being in free communication with the liquid supply, so that the pressure in such space is substantially the same as the pressure of the liquid supply, thereby preventing leakage from the chamber associated with such piston-like extension, past such extension.

7. Means for controlling the flow of liquid into a vessel, according to claim 2, in which the auxiliary valve passes through a space in free communication with a place of pressure at or above the pressure in the vessel and adapted to prevent leakage from the chamber associated with the piston-like extension, past such auxiliary valve.

8. Means for controlling the flow of liquid into a vessel, according to claim 2, in which the auxiliary valve passes through a space in free communication with the liquid supply so that the pressure in such space is substantially the same as the pressure of the liquid supply, thereby preventing leakage from the chamber associated with the piston-like extension, past such auxiliary valve.

9. Means for controlling the flow of liquid into a vessel, according to claim 2, in which the piston-like extension of the main valve has passages formed therein adapted to remain in constant communication with other passages in the valve casing leading to a place of lower pressure than prevails in the vessel and through which passages the liquid leaking past the auxiliary valve can flow.

Signed at London, England, this 18th day of June, 1928.

HAROLD HILLIER.